United States Patent [19]

Nakano et al.

[11] Patent Number: 4,918,922
[45] Date of Patent: Apr. 24, 1990

[54] MASTER CYLINDER PISTON WITH INTAKE VALVE AND FLOW/RESISTING ANNULAR RING

[75] Inventors: Toshihiro Nakano, Chiryu; Shinji Sakata, Nishio; Hitoshi Ichioka, Toyota; Kiyohiko Minagawa, Anjo; Hideaki Iijima, Hazu, all of Japan

[73] Assignee: Aisin Seiki Kabushiki Kaisha, Kariya, Japan

[21] Appl. No.: 345,247

[22] Filed: May 1, 1989

[30] Foreign Application Priority Data

Apr. 30, 1988 [JP] Japan .................. 63-058907[U]

[51] Int. Cl.$^5$ ............................................. B60T 11/20
[52] U.S. Cl. ................................................. 60/589
[58] Field of Search ........................ 60/585, 588, 589

[56] References Cited

U.S. PATENT DOCUMENTS

| | | | |
|---|---|---|---|
| 4,384,458 | 5/1983 | Kawaguchi | 60/589 X |
| 4,550,567 | 11/1985 | Schaefer | 60/589 X |
| 4,753,075 | 6/1988 | Nomura et al. | 60/589 |
| 4,773,224 | 9/1988 | Sakamoto et al. | 60/589 |

Primary Examiner—Robert E. Garrett
Assistant Examiner—George Kapsalas
Attorney, Agent, or Firm—Burns, Doane, Swecker & Mathis

[57] ABSTRACT

A master cylinder includes a valve that is slidably mounted in a movable piston means for limited axial movement therein between a closed position wherein the valve is sealingly engaged with the piston and an open position wherein a gap is maintained between the valve and the piston. The valve includes a passage for providing fluid communication between the supply chamber and the pressure chamber when the valve is in the open position. An orifice in the piston limits the flow of fluid from the pressure chamber to the supply chamber at least during the limited movement of the valve from the open position to closed position. An overflow arrangement on the piston is responsive to movement of the piston against the bias of a biasing device for establishing fluid communication between the passage and the supply chamber only when the valve is in the closed position.

8 Claims, 2 Drawing Sheets

MASTER CYLINDER PISTON WITH INTAKE VALVE AND FLOW/RESISTING ANNULAR RING

BACKGROUND OF THE INVENTION

1. Field of the Invention

The present invention relates to a master cylinder which is used with a hydraulic brake system or a hydraulic clutch system for an automobile. More particularly, the invention relates to a master cylinder of the portless type having a piston provided with a valve means for establishing or interrupting communication between a pressure chamber and a fluid reservoir.

2. Description of Related Art

A typical master cylinder is disclosed, for example, in Japanese Patent Publication No. 56-142743 published on Nov. 7, 1981. That master cylinder includes a transmitting member for operating a valve means in accordance with the stroke of a piston which is connected to the transmitting member so as to move the transmitting member a distance in the axial direction. The transmitting member is engaged with a stopper ring and the stopper ring is snugly fitted in an inner bore of a cylinder body while the piston is at a rest position. The transmitting member removes a valve body from a valve seat so as to communicate a pressure chamber with a supply chamber to which brake fluid is supplied from the fluid reservoir. As a result of that construction, the axial length of the master cylinder may be reduced.

However, since the valve body which is made of an elastic material, such as rubber, is subject to deformation due to the hydraulic pressure in the pressure chamber, upon the return movement of the piston, the valve body cannot be removed from the valve seat. That means that fluid communication between the pressure chamber and the supply chamber is interrupted while the master cylinder is out of use and as a result a braking force is generated even though the master cylinder is not in use. In light of that problem, the distance between the valve body and the valve seat must be set at a sufficient distance so as to avoid the above mentioned brake application while the master cylinder is out of use. However, one of the problems associated with that construction is that during the movement of the valve body towards the valve seat, the pressure in the pressure chamber is not immediately increased in direct proportion to the depression of the brake pedal. Therefore, most of the pedal stroke is not directed towards increasing the pressure in the pressure chamber. That results in an uncomfortable or inconsistent brake operation.

Though this drawback can be overcome by providing an orifice at a communicating hole in the piston, that arrangement results in insufficient braking force since air mixed in the brake fluid cannot be returned to the supply chamber due to the very small movement of brake fluid between the supply chamber and the pressure chamber.

SUMMARY OF THE INVENTION

It is, therefore, an object of the present invention to provide a master cylinder without the above-mentioned drawbacks.

It is another object of the present invention to provide a master cylinder having a sufficient braking force, a smaller idle stroke of the brake pedal and a comfortable feel during brake pedal operation.

According to the present invention, a master cylinder is comprised of a body having an inner bore and piston means sealingly mounted in the inner bore for axial movement therein. The body and the piston means define a supply chamber in fluid communication with a source of fluid and a pressure chamber having an outlet therein. The master cylinder also includes means for biasing the piston means in one axial direction within the inner bore and valve means slidably mounted in the piston means for limited axial movement therein between a closed position wherein the valve means is sealingly engaged with the piston means and an open position wherein a gap is maintained between the valve means and the piston means. The valve means includes passage means for providing fluid communication between the supply chamber and the pressure chamber when the valve means is in the open position, orifice means in the piston means for limiting flow of the fluid from the pressure chamber to the supply chamber at least during the limited movement of the valve means from the open position to the closed position and overflow means on the piston means that is responsive to movement of the piston means against the bias of the biasing means for establishing fluid communication between the passage means and the supply chamber only when the valve means is in the closed position.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A master cylinder in accordance with the preferred embodiments of the present invention will be described with reference to the drawings.

Figure 1:
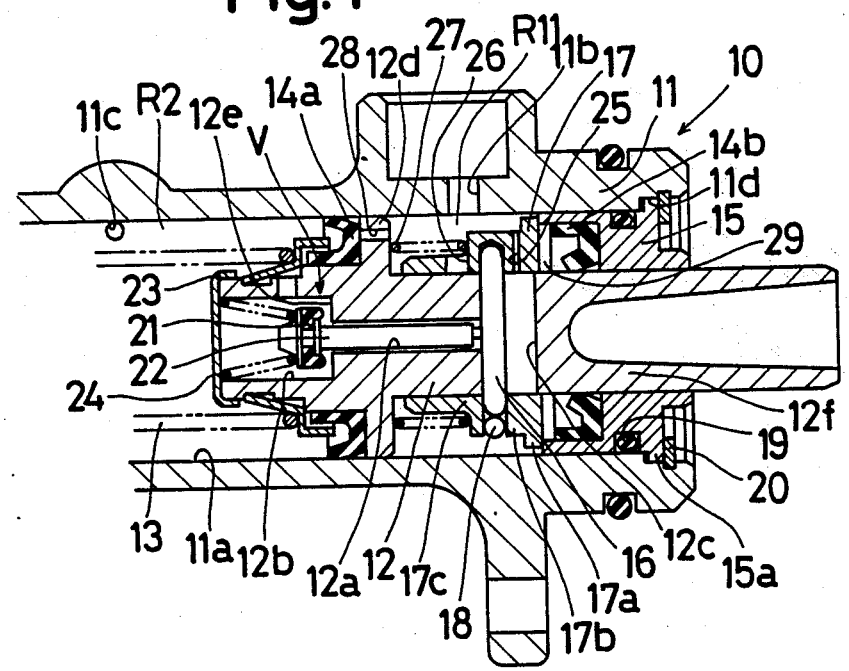
FIG. 1 is a cross-sectional view of an essential portion of a first embodiment of a master cylinder in accordance with the present invention.

Referring to FIG. 1, a master cylinder 10 is provided with a cylinder body 11. The cylinder body 11 is formed with an inner bore 11a in the form of a blind bore and brake fluid is accommodated in the inner bore 11a. A piston 12 and a return spring 13 are also positioned in the inner bore 11a. The piston 12 is sealingly and slidably fitted in the inner bore 11a of the cylinder body 11 through a primary piston cup 14a that is positioned on the outer circumference of the piston 12. Further, the piston 12 is sealingly and slidably fitted in a secondary piston cup 14b that is installed in a case member 15. The case member 15 is snugly fitted in the inner bore 11a adjacent the small diameter portion 12f of the piston 12. The left side surface of the piston 12 engages one end of the return spring 13 which is engaged with a bottom surface (not shown) of the inner bore 11a, in the case of a single master cylinder, or with a secondary piston (not shown), in the case of the tandem master cylinder, at its other end as seen in FIG. 1. An annular ring member 17 is fitted on the outer circumference of the piston 12 and is installed on the piston 12 so as to be axially movable with respect to the piston 12 for a distance equal to a second predetermined value by a stopper pin 16 which will be described in more detail later. In that way, the piston 12 is biased in the right direction by the return spring 13 and is maintained at a rest position as shown in FIG. 1 by the contact between the annular ring member 17 and the case member 15. The piston 12 defines a supply chamber R1 which is in fluid communication with a fluid reservoir through a supply port 11b. The piston 12 also defines a pressure chamber R2 which is selectively communicated with the supply chamber R1 through a valve means, which will be described in more detail later and which is in fluid communication with a hydraulic pressure conduit (not shown) through an outlet port 11c in the inner bore 11a.

In the opening of the inner bore 11a of the cylinder body 11, a large diameter portion 11d is formed and the case member 15 is sealingly fitted into the opening of the inner bore 11a through an O ring 19 which is installed in a circular groove in the outer circumference of the case member 15. The end of the case member 15 that opens toward the supply chamber R1 is provided with a concave portion in which the secondary piston cup 14b is installed. Further, the case member 15 is provided with a flange portion 15a at its right end as seen in FIG. 1. The case member 15 is secured to the cylinder body 11 by a snap ring 20 which is installed in a circular groove formed near the opening of the inner bore 11a and by the positioning of the flange portion 15a in the stepped portion of the large diameter portion 11a of the cylinder body 11. A cup seal engaging member 29 regulates the position of the second piston cup 14b.

The piston 12 is provided with a flange portion 12d which is slidably guided in the inner bore 11a. The primary piston cup 14a is positioned adjacent the outer circumference of the flange portion 12d. Also, the piston 12 is provided with a centrally located hole 12a and a concave portion 12b into which the hole 12a opens and in which a valve means V which will be described in more detail later is accommodated. Further, the piston 12 is provided with a penetrating hole 12c into which the other end of the hole 12a opens. Both ends of the penetrating hole 12c open into the supply chamber R1. Thus, a passage means for providing communication between the supply chamber R1 and the pressure chamber R2 is defined by the hole 12a and the penetrating hole 12c. The penetrating hole 12c extends in the axial direction and plural penetrating holes are formed in the side portion of the concave portion 12b.

The annular ring member 17 is slidably fitted in the axial direction on the outer circumference of the piston 12. The annular ring member 17 includes a large diameter portion 17b having a flange portion 17a at its one end and a small diameter portion 17d. A hole 17c is formed in the large diameter portion 17b, and one end of the hole 17c opens to the supply chamber R1. The hole 17c opens to the penetrating hole 12c. The stopper pin 16 is fitted into the hole 17c and passes through the penetrating hole 12c. The stopper pin 16 is secured in the hole 17c by a steel ball 18 which is pressed into the hole 17c. Thus, the annular ring member 17 is installed on the piston 12 so as to be movable with regard to the piston 12 for a distance corresponding to the second predetermined value. The stopper pin 16 contacts the pressure chamber R2 side surface of the penetrating hole 12c and the flange portion 17a of the annular ring member 17 contacts the supply chamber R1 side surface of the case member 15 when the piston 12 is in the rest position as shown in FIG. 1.

The valve means V comprises a valve rod 22 on which is installed a valve body 21. The valve body 21 is able to seat on a valve seat 12e formed on the bottom surface of the concave portion 12b at its one end and is loosely fitted in the hole 12a at its other end. A retainer 23 is secured in a circular groove on the outer circumferential surface of the pressure chamber R2 side of the piston 12 and engages the other end of the return spring 13. A spring 24 engages an inner surface of the retainer 23 at its one end and biases the valve body 21 toward the valve seat 12e and the stopper pin 16.

In the valve means V having the above construction, the other end of the valve rod 22 contacts the stopper pin 16 and the valve rod 22 moves toward the pressure chamber R2 against the force of the spring 24 when the piston 12 is in the rest position as shown in FIG. 1. Thus, the valve body 21 is separated from the valve seat 12e by a distance corresponding to a first predetermined value and the passage means is open. When the piston 12 moves more than first predetermined value so that the piston 12 is in the operative position, the other end of the valve rod 22 is separated from the stopper pin 16 and the valve body 21 is seated on the valve seat 12e. Hence, the passage means is interrupted and hydraulic pressure is generated in the pressure chamber R2. At that point, the second predetermined value is larger than the first predetermined value.

Further, in this embodiment, the annular ring member 17 is provided with an orifice hole 25 that serves as a means for limiting fluid communication between the supply chamber R1 and the penetrating hole 12c. The annular ring member 17 is also provided with a large diameter hole 26 that serves as an overflow means for defining a fluid passage between the supply chamber R1 and the penetrating hole 12c only when the valve means V is in the closed position (i.e., when the piston 12 moves more than the first predetermined value). The annular ring member 17 is fitted on the piston 12 by a clearance fit so as not to allow fluid communication between the supply chamber R1 and the penetrating hole 12c at the clearance between the inner circumferential surface of the annular ring member 17 and the outer circumferential surface of the small diameter portion 12f of the piston 12. Also, a spring 27 is interposed between the flange portion 12a of the piston 12 and the stepped portion of the annular ring 17 between the small diameter portion 17d and the large diameter portion 17b so that the annular ring member 17 is normally biased toward the case member 15.

According to the embodiment described above, when the piston 12 moves more than the first predetermined value toward the pressure chamber R2 by the pushing of a push rod (not shown) during the depression operation of the brake pedal, the other end of the valve rod 22 is separated from the stopper pin 16 and the valve body 21 is seated on the valve seat 12e by the spring 24. As a result, fluid communication between the supply chamber R1 and the pressure chamber R2 is interrupted and hydraulic pressure is generated in the pressure chamber R2 in response to the movement of the piston 12. Until the valve body 21 seats on the valve seat 12e, the flow of fluid from the pressure chamber R2 to the supply chamber R1 is limited by the orifice hole 25 provided in the annular ring member 17. Accordingly, even though a gap is present (corresponding to the first predetermined value) between the valve body 21 and the valve seat 12e when the piston 12 is in the rest position, the hydraulic pressure in the pressure chamber R2 begins to increase before the valve body 21 seats on the valve seat 12e. Therefore, the idle stroke of the brake pedal is reduced and the brake feel during the brake pedal operation is improved.

Further, when the piston 12 moves more than the second predetermined value toward the pressure chamber R2, the stopper pin 16 contacts the case 15 side surface of the penetrating hole 12c through the force of the spring 27, and the stopper pin 16 and the annular ring member 17 move with the piston 12. At that time, due to the movement of the piston by a distance greater than the second predetermined value, fluid communication between the supply chamber R1 and the passage means (penetrating hole 12c and hole 12a) is established through the large diameter hole 26 and is not limited by the orifice hole 25. Therefore, the mixed air in the brake fluid which remains in the passage means can be returned toward the reservoir (not shown) through the large diameter hole 26 and the supply chamber R1. In other words, the mixed air introduced into the passage means with the brake fluid from the pressure chamber R2 to the supply chamber R1 when the valve means V is closed does not remain in the passage means. Thus, the problems associated with the mixed air in the brake fluid remaining in the pressure chamber R2 are reduced and problems relating to the lack of a brake force are overcome.

When the brake pedal is released, the piston 12 returns to the rest position as shown in FIG. 1 by the return spring 13. As a result, the valve means V is opened to the passage means and fluid communication between the supply chamber R1 and the pressure chamber R2 is established. At that time, negative pressure is generated in the pressure chamber R2 as a consequence of the flow resistance of the hydraulic pressure passage. Then, the brake fluid in the supply chamber R1 is introduced to the pressure chamber R2 through a back surface of the primary piston cup 14a and the plural small holes 28 provided on the flange portion 12d of the piston 12 due to the negative pressure in the pressure chamber R2. Thus, a slow return of the piston 12 to its rest position is prevented. Also, the aforementioned operation acts when the brake pedal is depressed numerous times for a short time (for example, when the operation for pulling out the mixed air is acted), whereby the pressure in the pressure chamber R2 is increased.

Figure 2:
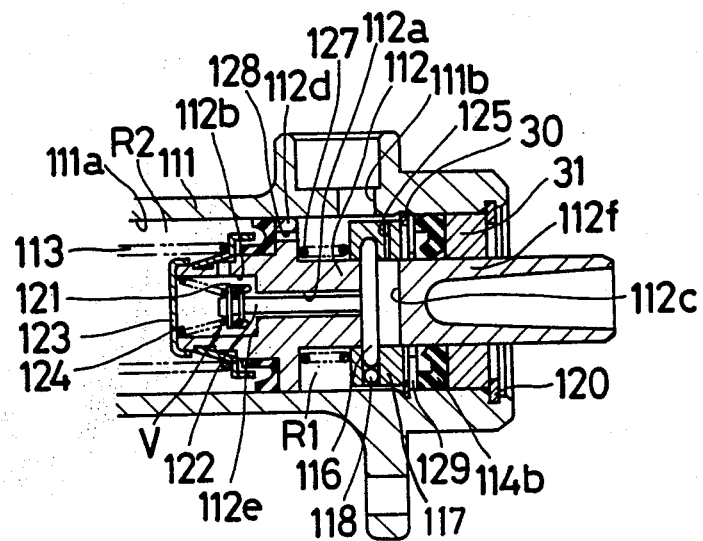
FIG. 2 is a cross-sectional view of an essential portion of a second embodiment of the master cylinder in accordance with the present invention.
Figure 3:
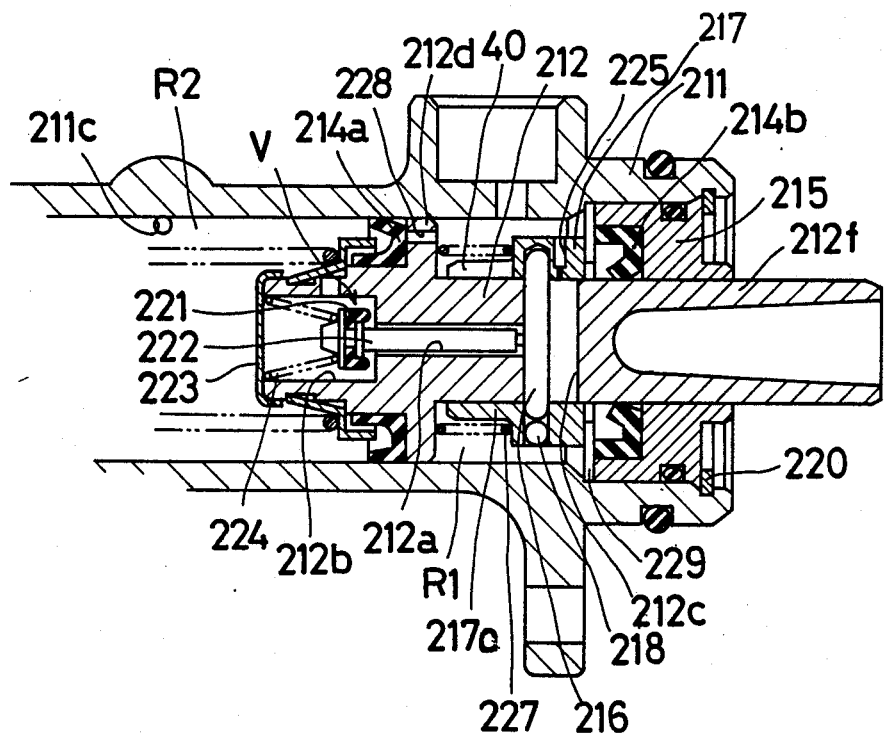
FIG. 3 is a cross-sectional view of an essential portion of a third embodiment of the master cylinder in accordance with the present invention.

FIG. 2 and FIG. 3 show second and third embodiments of the master cylinder in accordance with the present invention, respectively. Referring to FIG. 2, a snap ring 30 is snugly fitted in the inner bore 111a of the cylinder body 111. A cup seal engaging member 129, a secondary cup seal 114b and a cup seal engaging member 31 are successivley positioned in the inner bore 111a of the cylinder bore 111 from the snap ring 30 toward the open end of the inner bore 111a. Also, the annular ring member 117 has a straight cylindrical shape. The annular ring member 117 contacts the snap ring 30 when the piston 112 is in the rest position, and the end portion of the pressure chamber R2 side of the annular ring member 117 is opened to the penetrating hole 112c when the piston 112 moves more than the first predetermined value. The remaining features of the embodiment illustrated in FIG. 2 are similar to those described above with reference to FIG. 1 and consequently, the description of those features is omitted here. The features in FIG. 2 that correspond to those in FIG. 1 are numbered in a manner similar to the corresponding numbers in FIG. 1 except for the addition of a numeral 1 before each reference numeral.

Referring to FIG. 3, the case member 215 is engaged with a stepped portion in the inner bore 211a through the cup seal engaging member 229 at its left end portion as seen in FIG. 3. Also, a slit 40 is located at the small diameter portion 217c of the annular ring member 217 and the slit 40 is opened to the penetrating hole 212c when the piston 212 moves more than the first predetermined value. The remaining features of the embodiment illustrated in FIG. 3 are similar to those features described above with reference to FIG. 1 and thus, a description of those features will not be repeated here. The features in FIG. 3 that correspond to those in FIG. 1 are correspondingly numbered except for the addition of a numeral 2 before each reference numeral.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. A master cylinder comprising;
a body having an inner bore;
piston means sealingly mounted in the inner bore for axial movement therein, the body and the piston means defining a supply chamber in fluid communication with a source of fluid and a pressure chamber having an outlet therein;
biasing means for biasing the piston means in one axial direction within the inner bore;
valve means slidably mounted in the piston means for limited axial movement therein between a closed position wherein the valve means is sealingly engaged with the piston means and an open position wherein a gap is maintained between the valve means and the piston means, the valve means including passage means for providing fluid communication between the supply chamber and the pressure chamber when the valve means is in open position;
orifice means in the piston means for limiting flow of the fluid from the pressure chamber to the supply chamber at least during the limited movement of the valve means from the open position to closed position; and
overflow means on the piston means that is responsive to movement of the piston means against the bias of the biasing means for establishing fluid communication between the passage means and the supply chamber only when the valve means is in the closed position.

2. A master cylinder as recited in claim 1, wherein the piston means includes means for closing the orifice means when the piston means is axially moved against the bias of the biasing means more than a predetermined value.

3. A master cylinder as recited in claim 1, wherein the piston means includes means for opening the overflow means when the piston means is axially moved against the bias of the biasing means more than a predetermined value.

4. A master cylinder as recited in claim 3, wherein the overflow means includes an annular ring member slidably mounted on the piston means, the annular ring member including at least one opening for providing fluid communication between the passage means and the supply chamber.

5. A master cylinder as recited in claim 4, wherein the opening is slit-shaped.

6. A master cylinder as recited in claim 4, wherein the opening is tubular-shaped.

7. A master cylinder as recited in claim 3, wherein the overflow means includes an annular ring member slidably mounted on the piston means, the piston means and the annular ring member defining a space therebetween for providing fluid communication between the passage means and the supply chamber.

8. A master cylinder as recited in claim 1, wherein the overflow means includes an annular ring member slidably mounted on the piston means, the annular ring member including at least one opening therein for providing fluid communication between the passage means and the supply chamber, and the orifice means including a hole through the annular ring member.

* * * * *